(12) United States Patent
Olsen et al.

(10) Patent No.: US 10,288,044 B2
(45) Date of Patent: May 14, 2019

(54) RECEPTOR FOR A LIGHTNING PROTECTION SYSTEM

(71) Applicant: Global Lightning Protection Services A/S, Herning (DK)

(72) Inventors: Flemming Bjørn Olsen, Beder (DK); Casper Falkenstrøm Mieritz, København V (DK); Kim Bertelsen, Ulfborg (DK); Thomas Holm Krogh, Klovborg (DK); Søren Find Madsen, Hvalsø (DK); Allan Laursen Molbech, Lem St. (DK)

(73) Assignee: PolyTech A/S, Bramming (DK)

( * ) Notice: Subject to any disclaimer, the term of this patent is extended or adjusted under 35 U.S.C. 154(b) by 0 days.

(21) Appl. No.: 15/566,125

(22) PCT Filed: Sep. 23, 2015

(86) PCT No.: PCT/DK2015/050290
§ 371 (c)(1),
(2) Date: Oct. 12, 2017

(87) PCT Pub. No.: WO2016/165714
PCT Pub. Date: Oct. 20, 2016

(65) Prior Publication Data
US 2018/0094621 A1    Apr. 5, 2018

(30) Foreign Application Priority Data

Apr. 17, 2015  (WO) ................ PCT/DK2015/050100

(51) Int. Cl.
*F03D 80/30* (2016.01)
*F03D 13/10* (2016.01)
(52) U.S. Cl.
CPC ............. *F03D 80/30* (2016.05); *F03D 13/10* (2016.05); *Y02E 10/72* (2013.01)

(58) Field of Classification Search
CPC ........... F03D 80/30; F03D 13/10; Y02E 10/72
See application file for complete search history.

(56) References Cited

U.S. PATENT DOCUMENTS 4,628,402 A    12/1986  Covey
9,612,264 B2 *  4/2017  Bruins .................... F03D 80/00
(Continued)

FOREIGN PATENT DOCUMENTS

CN    102365454 A    2/2012
CN    103329379 A    9/2013
(Continued)

OTHER PUBLICATIONS

International Search Report dated Dec. 14, 2015 for International Application No. PCT/DK2015/050290.
(Continued)

*Primary Examiner* — Hieu T Vo
(74) *Attorney, Agent, or Firm* — Brinks Gilson & Lione (57) ABSTRACT

A receptor assembly (1; 5) for a lightning protection system for a wind turbine blade (2) is disclosed, comprising electrically conducting current carriers (6; 19) and mounting bolts (9) and/or threaded rods (20), wherein each of the current carriers is a metallic part arranged and dimensioned to surround at least a part of a mounting bolt or a threaded rod without being in electrical contact with the mounting bolt or threaded rod, at least a part of the external surface at one end of each current carrier is arranged to be a contact surface (10) for mechanical and electrical contact to a receptor base (3; 16) in such a way that, in the case of a lightning impact on the receptor, the lightning current passes through the one or more current carriers rather than through the one or more mounting bolts and/or threaded rods on its way through the receptor.

19 Claims, 8 Drawing Sheets

(56) References Cited

U.S. PATENT DOCUMENTS

2013/0149153 A1 6/2013 Fujioka et al.
2013/0236321 A1 9/2013 Olthoff

FOREIGN PATENT DOCUMENTS

| CN | 203339481 U | 12/2013 |
| CN | 104220747 A | 12/2014 |
| EP | 1 772 621 A2 | 4/2007 |
| WO | WO 2005/031158 A2 | 4/2005 |
| WO | WO 2010/100283 A1 | 9/2010 |
| WO | WO 2014/200333 A1 | 12/2014 |

OTHER PUBLICATIONS

Office Action for Chinese Application No. 201580077604.9 dated Nov. 13, 2018 and English translation.

* cited by examiner

RECEPTOR FOR A LIGHTNING PROTECTION SYSTEM

This application claims the benefit under 35 U.S.C. § 371 of International Application No. PCT/DK2015/050290, filed Sep. 23, 2015, which claims the benefit of International Application No. PCT/DK2015/050100 filed Apr. 17, 2015; which are incorporated by reference herein in their entirety.

The present invention relates to a surface-mounted receptor for a lightning protection system for a wind turbine blade.

BACKGROUND OF THE INVENTION

Most known lightning protection systems for wind turbine blades comprise one or more internally arranged down conductors and a number of lightning receptors arranged on the external surface of the blade. Typically, there is a tip receptor arranged at the tip of the wind turbine blade and a number of side receptors distributed on the surface of the wind turbine blade along at least a part of the length thereof.

It is a well-known problem that such external lightning receptors can be damaged by lightning impacts and that, therefore, the lifetime of such receptors is limited, depending on the number of lightning impacts to which they are subjected.

A typical side receptor as known in the art simply consists of a metal bolt, the head of which is aligned with the external surface of the wind turbine blade and the thread part of which is screwed into a side receptor base arranged within the wind turbine blade. The electrically conducting side receptor base is electrically grounded so that the current from lightning strikes impacting the head of the side receptor passes through the thread part thereof to the side receptor base and further through the wind turbine blade and the wind turbine tower to the ground.

A number of problems are related to the use of such typical side receptors. For instance, the head of the side receptor is often damaged by the impacts of lightning strikes. This means that any recesses (slots) or other structural elements in the head meant for engagement by tools may have at least partly disappeared after a number of lightning impacts. Therefore, it is often more or less impossible to unscrew the side receptor, for instance in order to replace it. Ironically, the more a replacement of a side receptor is needed, the more difficult it may be to remove it.

Another problem is that, because the lightning current must pass through the threads of the side receptor, manufacturers are often reluctant to use threadlockers or other adhesives for securing the side receptor because it may reduce the conductivity between the side receptor and the side receptor base.

Similar problems exist when it comes to replacement of tip receptors known in the art, especially when the tip receptors have been damaged by the impacts of lightning strikes.

BRIEF DESCRIPTION OF THE INVENTION

It is an object of the present invention to provide a receptor for at lightning protection system, which overcomes at least partly the above-mentioned disadvantages of receptors known in the art.

The present invention relates to a receptor assembly for a lightning protection system for a wind turbine blade, which receptor assembly comprises one or more electrically conducting current carriers and one or more mounting bolts and/or threaded rods, wherein each of the current carriers is a metallic part arranged and dimensioned to surround at least a part of a mounting bolt or a threaded rod without being in electrical contact with the mounting bolt or threaded rod, at least a part of the external surface at one end of each current carrier is arranged to be a contact surface for mechanical and electrical contact to a receptor base when the receptor is mounted within a wind turbine blade, in such a way that, in the case of a lightning impact on the receptor, the vast majority of the lightning current passes through the one or more current carriers rather than through the one or more mounting bolts and/or threaded rods on its way through the receptor.

The invention makes use of the fact that the current tends to pass along the surfaces of the conductors rather than through the more central parts thereof. This means that only a negligible part of the lightning currents pass through the mounting bolts or threaded rods, which are therefore not damaged, when the receptor assembly is subject to a lightning impact. This means, in turn, that the bolts or threaded rods are kept intact and can be used normally in case of the need for replacement of the receptor assembly or parts thereof.

In an embodiment of the invention, the receptor assembly is in the form of a side receptor comprising a current carrier in the form of a tubular receptor cylinder with one partly closed end penetrated by a centered hole, at least a part of the external surface of which partly closed end is arranged to be a contact surface for mechanical and electrical contact to a side receptor base when the side receptor is mounted within a wind turbine blade, and the diameter of which centered hole is slightly larger than the diameter of the thread part of a mounting bolt, wherein the inner diameter of the receptor cylinder is larger than the diameter of the head of the mounting bolt and the internal length of the receptor cylinder is larger than the height of the head of the bolt so that the mounting bolt can be arranged with its head concealed within the receptor cylinder and its thread part protruding through the centered hole in the partly closed end thereof, and wherein a receptor plug is dimensioned to fit into the end of the receptor cylinder opposite the partly closed end to cover the head of the mounting bolt concealed therein.

A side receptor configured this way is advantageous, for instance, in that the head of the mounting bolt are protected from being damaged by lightning strikes and, therefore, stays intact so that the side receptor can be removed for replacement whenever needed.

Another advantage is that the lightning current passes through the contact surface rather than through the threads of the mounting bolt and that, therefore, there are no problems related to using threadlockers or other adhesives for securing the mounting bolt and thereby the side receptor.

In an embodiment of the invention, the receptor plug consists of a heat resistant paste, such as silicone.

In an embodiment of the invention, a screw cap, made for instance by high-density polyethylene (HDPE), is arranged within the slot of the mounting bolt.

Placing a screw cap within the slot of the mounting bolt protects the slot and ensures that it is not filled by paste, from which the receptor plug may be formed, which could be troublesome when a tool has to engage with this slot for loosening and removal of the mounting bolt.

In an embodiment of the invention, the receptor plug is made from a solid material, such as a metal, a plastic material, rubber or fibreglass.

In this case, the solid plug may be drilled out, when the side receptor has to be replaced and access to the mounting bolt is needed.

In an embodiment of the invention, the side receptor further comprises an electrically insulating shim, made for instance from Glass Fibre Reinforced Polymer (GFRP) to be arranged between the head of the mounting bolt and the internal surface of the partly closed end of the receptor cylinder.

In an embodiment of the invention, the side receptor further comprises around the head of the mounting bolt a bolt insulator, made for instance from rubber, polymers or insulating composites (fibreglass or Bakelite), for insulating the mounting bolt electrically from the receptor cylinder.

The use of such a bolt insulator ensures that the lightning current does not pass through the mounting bolt.

In an embodiment of the invention, the bolt insulator is physically integrated within the receptor plug.

In an embodiment of the invention, the rounded surface of the receptor cylinder is slightly conical and wherein the side receptor further comprises a rubber gasket surrounding the receptor cylinder and having a slightly conical inner surface arranged to receive and fit the receptor cylinder, when the receptor cylinder is pressed into the rubber gasket during mounting of the side receptor in a wind turbine blade.

Pressing the conical receptor cylinder into a rubber gasket ensures a tight connection between the side receptor and the surrounding parts of the wind turbine blade surface, hence preventing water ingress between the conical receptor cylinder and the blade skin laminate.

In an embodiment of the invention, the thread diameter of the mounting bolt is between 8 mm and 15 mm, preferably between 10 mm and 12 mm.

In an embodiment of the invention, the outer edge of the receptor cylinder at the partly closed end thereof is bevelled so that at least a part of the contact surface is slanted.

In an embodiment of the invention, the angle between the bevelled part of the contact surface and the longitudinal axis of the receptor cylinder is between 30° and 70°, preferably between 55° and 65°, most preferred 59°.

The use of an at least partly slanted contact surface ensures a better mechanical contact and results in a larger contact surface for passage of the lightning current from the side receptor to the side receptor base. An angle of 59° corresponds to the shape of the end of a standard drill.

In an embodiment of the invention, the receptor cylinder further comprises at its end opposite the partly closed end a receptor ruff protruding outwards substantially perpendicularly to the longitudinal axis of the receptor cylinder.

A receptor ruff helps ensuring a tight connection between the side receptor and the surrounding surface of the wind turbine blade and ensures more material for the arc root erosion due to lightning impacts.

In an embodiment of the invention, the receptor cylinder consists at least partly of copper or a copper alloy.

The use of copper ensures a very high electric conductivity and a high thermal conductivity of the receptor cylinder.

In an embodiment of the invention, the receptor cylinder consists at least partly of steel.

The use of steel ensures a very high mechanical strength and reduces the risk of corrosion-related problems at a relatively low cost.

In an embodiment of the invention, the receptor cylinder consists at least partly of aluminium.

The use of aluminium allows easy mechanical processing at a relatively low cost.

In an embodiment of the invention, the receptor cylinder at its end opposite the partly closed end is covered with a protective layer of a temperature-resistant material, such as tungsten carbide.

In an embodiment of the invention, the receptor cylinder consists at least partly of tungsten carbide.

The use of tungsten carbide ensures a high electric conductivity, a high thermal conductivity and a very high melting temperature of the surface of the receptor cylinder and, hence, low susceptance to charge erosion from lightning strikes. Particularly, coatings of tungsten carbide applied on other materials have a proven high performance to the so-called long stroke components of lightning strikes. The chemical stability of tungsten carbide is high, meaning that the risk of corrosion-related problems is greatly reduced.

In an embodiment of the invention, the inner diameter of the receptor cylinder is between 10 mm and 40 mm, preferably between 15 mm and 30 mm.

In an embodiment of the invention, the wall thickness of the receptor cylinder is between 2 mm and 10 mm, preferably between 4 mm and 8 mm.

In an embodiment of the invention, the length of the receptor cylinder is between 15 mm and 150 mm, preferably between 20 mm and 50 mm.

In an embodiment of the invention, the receptor assembly further comprises a blade surface protection surrounding the receptor cylinder and extending outwards therefrom in a plane parallel to the blade skin, being applied onto the blade skin and being substantially aligned with the end of the receptor cylinder opposite the partly closed end and, if present, with the receptor ruff.

In an embodiment of the invention, the blade surface protection is made from a circular sheet of a heat-resistant plastic material, such as a polyester or polyamide film, fibreglass composite materials or high temperature ceramic compounds, which is fastened to the surface of the wind turbine blade by means of an adhesive.

In an embodiment of the invention, the receptor assembly comprises a tip receptor and one or more current carriers in the form of (preferably tubular) conducting bushings, the inner diameter of which bushings are larger than the diameter of bolts or threaded rods extending through the bushings for mounting the tip receptor to a tip receptor base, so that, when the tip receptor is mounted within a wind turbine blade, the tip receptor is in mechanical and electrical contact with one end of the conducting bushings and the tip receptor base is in mechanical and electrical contact with the other end of the conducting bushings.

In an embodiment of the invention, the tip receptor comprises, in a surface facing towards the tip receptor base when the tip receptor is mounted within a wind turbine blade, holes for receiving threaded rods and, in one or more other surfaces, one or more openings through which nuts can be mounted and tightened around the ends of the threaded rods within the tip receptor.

A tip receptor assembly configured this way is advantageous, for instance, in that the nuts or heads of the mounting bolts are protected from being damaged by lightning strikes and, therefore, stay intact so that the tip receptor can be removed for replacement whenever needed.

Another advantage is that the lightning current passes through the contact surface rather than through the threads of the mounting bolts or threaded rods and that, therefore, there are no problems related to using threadlockers or other adhesives for securing the mounting bolts or threaded rods and thereby the tip receptor.

In an embodiment of the invention, the receptor assembly further comprises receptor plugs dimensioned to fit into the openings to cover the nuts concealed therein.

In an embodiment of the invention, the receptor plug consists of a heat resistant paste, such as silicone.

In an embodiment of the invention, the receptor plug is made from a solid material, such as a metal, a plastic material, rubber or fibreglass.

In an embodiment of the invention, the thread diameter of the mounting bolts or threaded rods is between 6 mm and 15 mm, preferably between 8 mm and 12 mm.

In an embodiment of the invention, the bushings consist at least partly of copper or a copper alloy.

In an embodiment of the invention, the bushings consist consists at least partly of steel.

In an embodiment of the invention, the bushings consist consists at least partly of aluminium.

In an embodiment of the invention, the bushings consist consists at least partly of tungsten carbide.

In an embodiment of the invention, the wall thickness of the bushings is between 2 mm and 10 mm, preferably between 4 mm and 8 mm.

In an embodiment of the invention, the length of the bushings is between 15 mm and 150 mm, preferably between 20 mm and 50 mm.

In an embodiment of the invention, the total cross-sectional area of the bushings is larger than 40 cm$^2$, preferably larger than 70 cm$^2$.

In an aspect of the invention, it relates to a lightning protection system for a wind turbine blade comprising one or more receptor assemblies as described above.

In an aspect of the invention, it relates to a wind turbine comprising a lightning protection system as described above.

THE DRAWING

In the following, a few embodiments of the invention are described in more detail with reference to the drawing, of which

DETAILED DESCRIPTION OF THE INVENTION

Figure 1:
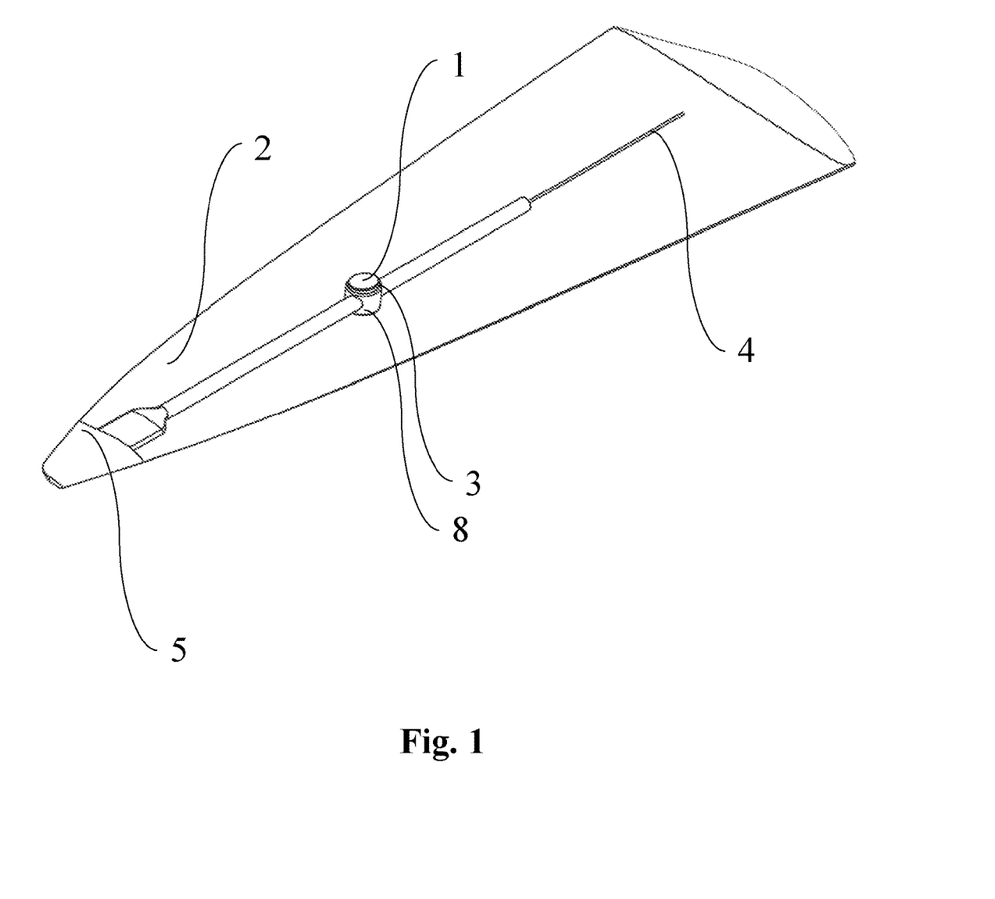
FIG. 1 illustrates schematically a wind turbine blade with a lightning protection system including a tip receptor and a side receptor as known in the art.

FIG. 1 illustrates schematically a wind turbine blade 2 with a lightning protection system including a side receptor 1 as known in the art. The side receptor 1 is mounted within the surface of the wind turbine blade 2, preferably aligned therewith, and mechanically and electrically connected with a side receptor base 3 arranged within the wind turbine blade 2 and covered by an insulation 8. The side receptor 1 being typically formed as a bolt, the connection to the side receptor base 3 consists simply in a threaded connection.

A down conductor 4 extending along the longitudinal axis of the wind turbine blade 2 ensures that the side receptor base 3 (and thereby the side receptor 1) and a tip receptor 5 of the wind turbine blade 2 are electrically connected to earth through the wind turbine nacelle and tower (not shown).

Figure 2A:
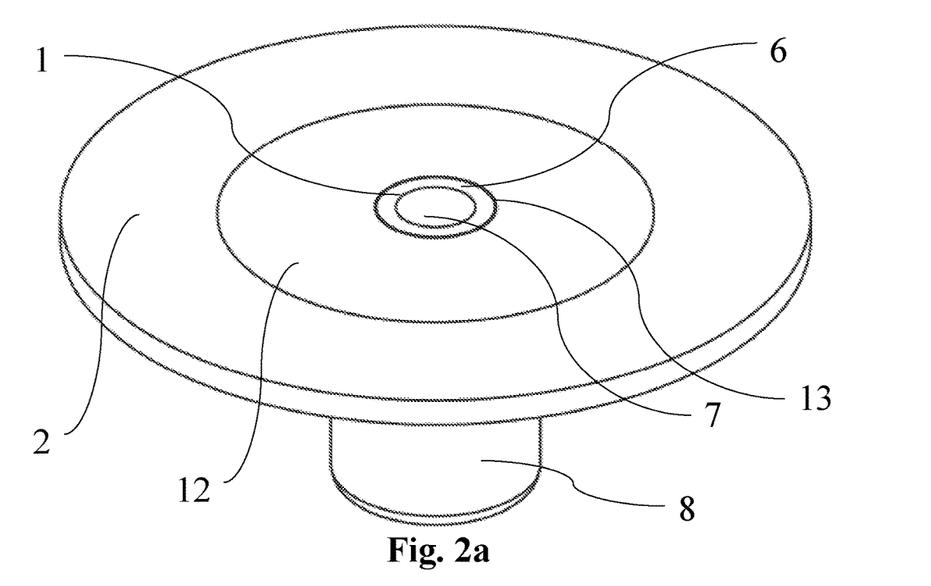
FIG. 2a is a perspective view of a receptor assembly according to an embodiment of the invention mounted within the surface of a wind turbine blade.
Figure 2B:
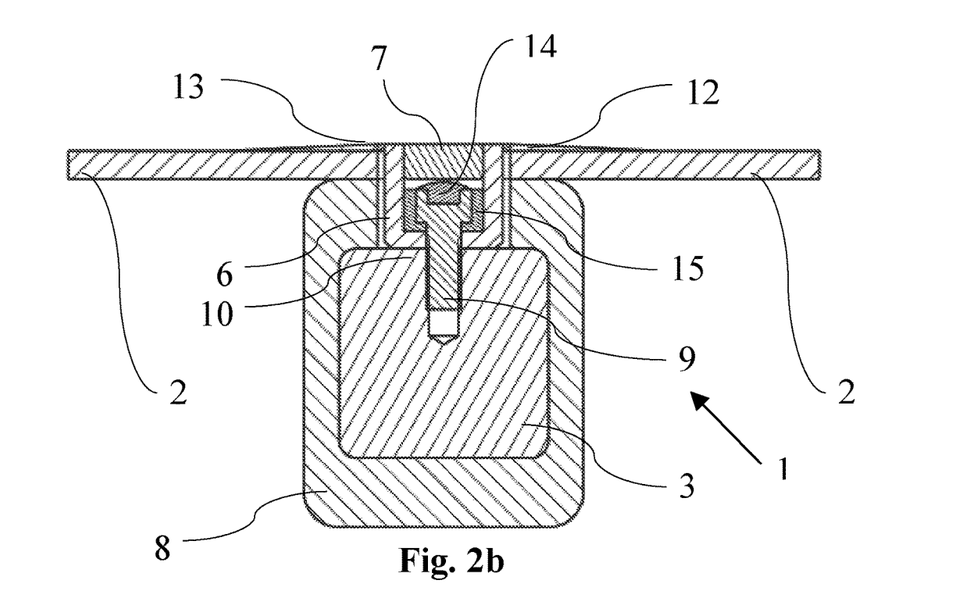
FIG. 2b is a cross-sectional view of the receptor assembly shown in FIG. 2a, FIG. 3a is a cross-sectional view of a receptor assembly according to an embodiment of the invention.

FIGS. 2a and 2b are a perspective view and a cross-sectional view, respectively, of a receptor assembly in the form of a side receptor 1 according to an embodiment of the invention mounted within the surface of a wind turbine blade 2. A receptor cylinder 6 constitutes the electrically conducting part of the side receptor 1. Its upper circular end forms the external part of the side receptor 1 being substantially aligned with the surface of the wind turbine blade 2 when the side receptor 1 is mounted therein. This is the part being impacted by lightning strikes.

The opposite end of the receptor cylinder 6 forms a contact surface 10 through which the lightning current passes from the side receptor 1 into the side receptor base 3 to which the side receptor 1 is connected. The receptor cylinder 6 is mechanically connected to the side receptor base 3 by means of a mounting bolt 9, the head of which is concealed within the receptor cylinder 6 and the thread part of which protrudes through a centered hole in the contact surface 10 of the receptor cylinder 6.

In the embodiment illustrated in these figures, the contact surface 10 is plane and perpendicular to the longitudinal axis of the receptor cylinder 6. In other embodiments, as for instance illustrated in FIG. 3b, the contact surface 10 or at least a part thereof can be slanted.

FIG. 2b shows how the insulation 8 covers the side receptor base 3 as well as the side receptor 1 connected thereto. This is very important for ensuring that the lightning strikes do, in fact, pass through the side receptor 1 rather than bypassing it by penetrating the shell of the wind turbine blade 2 next to the side receptor 1 on its path to the side receptor base 3 and the down conductor inside the wind turbine blade 2.

A washer can be arranged between the head of the mounting bolt 9 and the internal surface of the receptor cylinder 6 for securing the mounting bolt 9.

In the illustrated embodiment, the side receptor 2 comprises an optional blade surface protection 12 in the form of a circular sheet of a heat resistant material arranged around the receptor cylinder 6 for protecting the surface of the wind turbine blade 2 against being damaged from the excessive heat energy following lightning strikes impacting the side receptor 1. Advantageously, this blade surface protection 12 is adhered to the surface of the wind turbine blade 2 during the mounting of the side receptor 1 therein.

A sealant 13 ensures a tight connection between the side receptor 1 and the surrounding surface of the wind turbine blade 2.

The open end of the receptor cylinder 6 is closed by a receptor plug 7, which may either be made from a solid electrically conducting or insulating material or consist of a heat-resistant paste. This receptor plug 7 covers and protects the head of the mounting bolt 9 from being damaged from impacting lightning strikes. A screw cap 14 protects the slot of the mounting bolt 9, for instance against entrance of paste, if the receptor plug 7 consists of such a paste.

Furthermore, this embodiment of the side receptor 1 comprises a bolt insulator 15 arranged around the head of the mounting bolt 9 for ensuring electrical insulation between the mounting bolt 9 and the receptor cylinder 6 so that the lightning current is forced to pass through the contact surface 10 rather than through the threads of the mounting bolt 9 on its path from the side receptor 1 to the side receptor base 3.

Figure 3A:
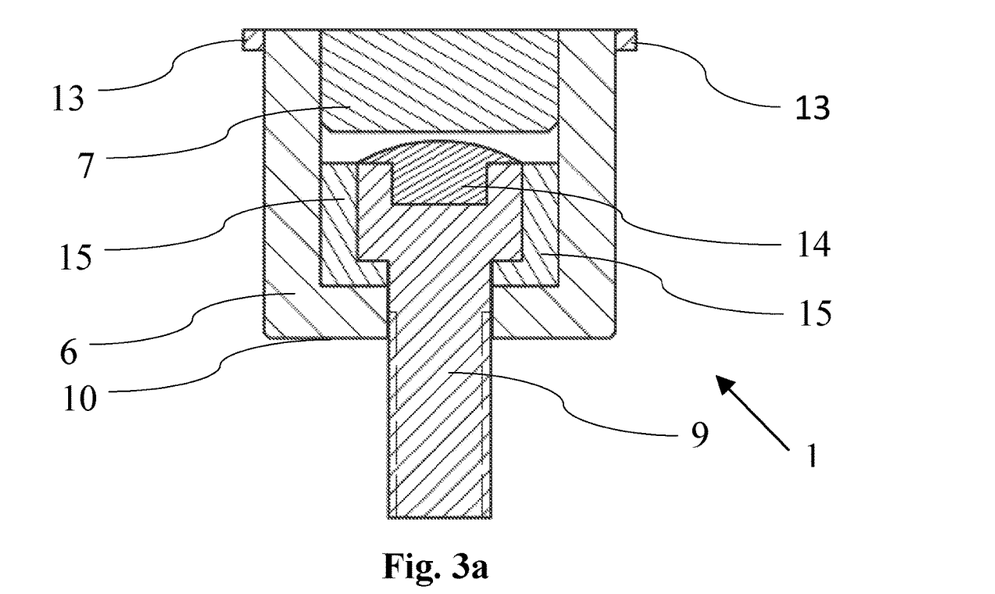
Figure 3B:
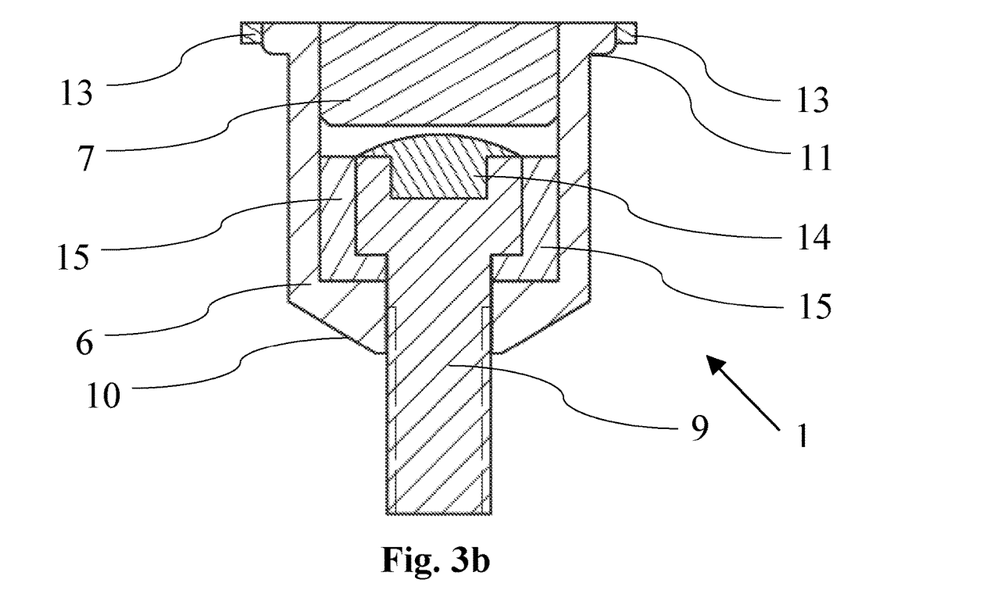
FIG. 3b is a cross-sectional view of a receptor assembly according to another embodiment of the invention.

FIG. 3a is an enlarged cross-sectional view of the side receptor 1 of the two previous figures, whereas FIG. 3b is a cross-sectional view of a receptor assembly in the form of a side receptor 1 according to another embodiment of the invention.

One difference from the embodiment shown in FIG. 3a is that in the embodiment shown in FIG. 3b, the receptor cylinder 6 is provided with a receptor ruff 11 extending outwards from the upper circular end of the receptor cylinder 6. Such a receptor ruff 11 is useful for ensuring a tight and weather-resistant connection between the side receptor 1 and the surrounding surface of the wind turbine blade 2 and provides additional material for the arc root erosion and, hence, the natural wear of the side receptor 1.

Furthermore, the edge of the receptor cylinder 6 is bevelled in such a way that at least a part of the contact surface 10 is slanted. This increases the area of the contact surface 10 and thereby improves the electrical connection to the side receptor base 3. Furthermore, it ensures a better mechanical stability of the connection between the side receptor 1 and the side receptor base 3.

Figure 4:
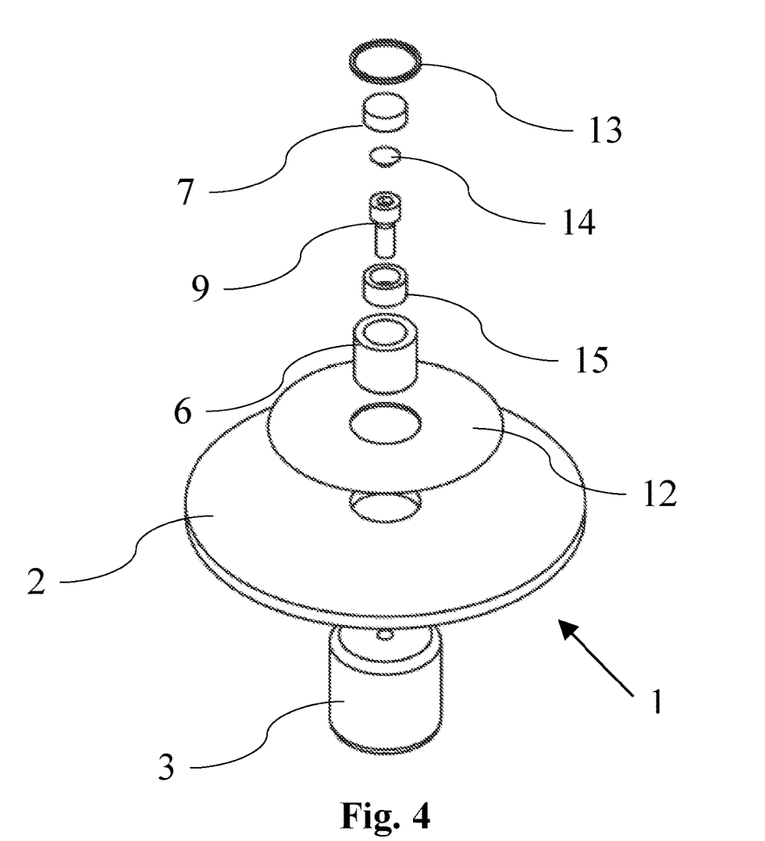
FIG. 4 is an explosive view of a receptor assembly according to a third embodiment of the invention mounted within the surface of a wind turbine blade.

FIG. 4 is an explosive view of the side receptor 1 mounted within the wind turbine blade 2 as shown in FIGS. 2a and 2b (but without the insulation 8 of the side receptor base). Again, the receptor plug 7 may either be made from a solid material or consist of a heat-resistant paste.

Figure 5:
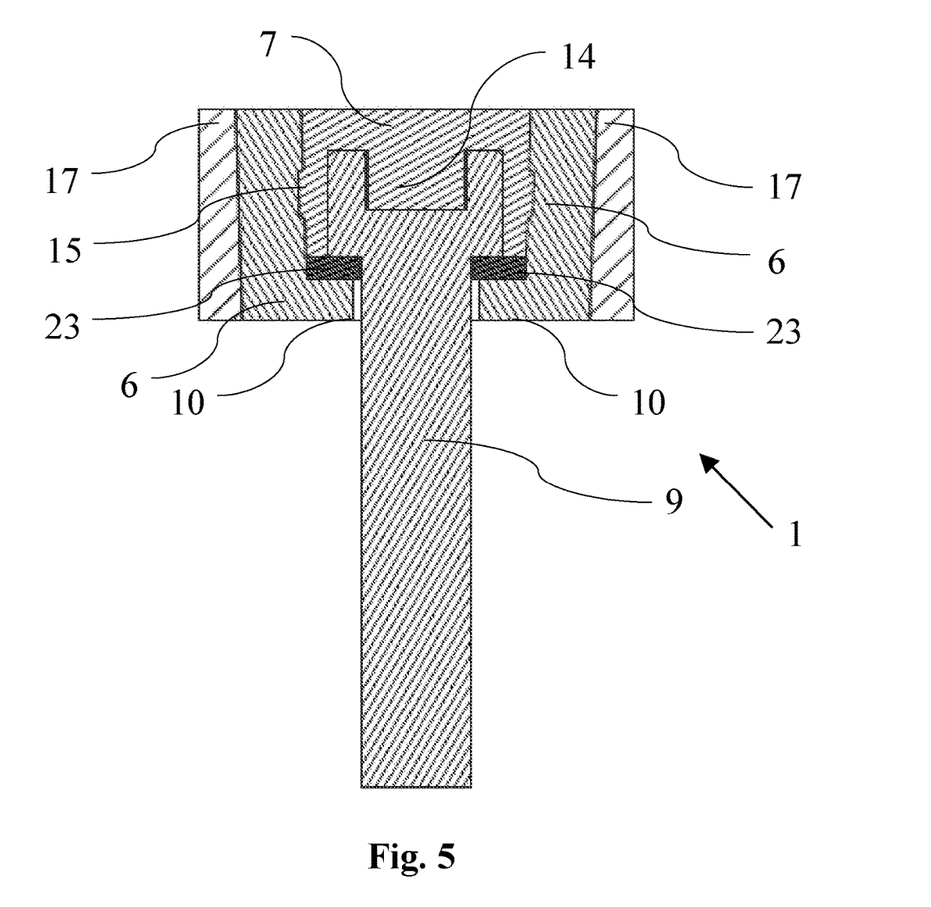
FIG. 5 is a cross-sectional view of a receptor assembly according to a fourth embodiment of the invention.
Figure 6:
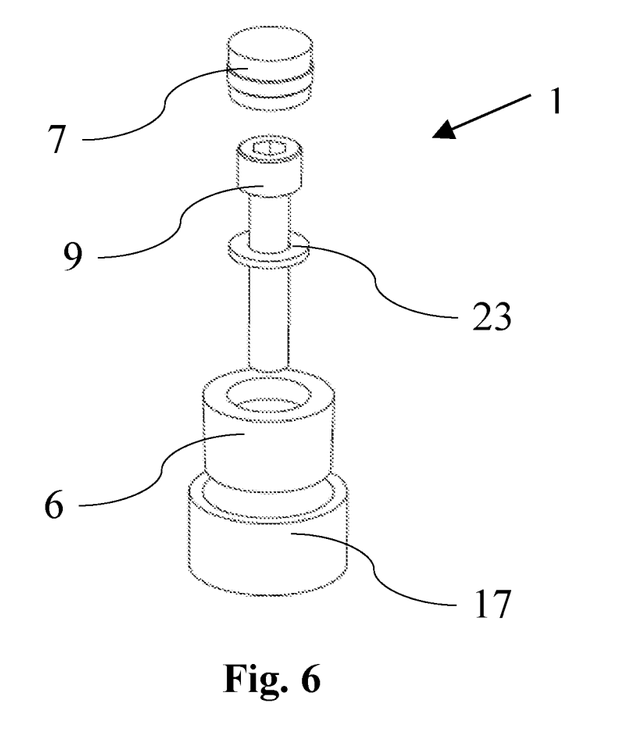
FIG. 6 is an explosive view of the receptor assembly shown in FIG. 5.

FIGS. 5 and 6 are a cross-sectional view and an explosive view, respectively, of a receptor assembly in the form of a side receptor 1 according to a yet another embodiment of the invention, which differs from the previously described embodiment in a number of aspects.

Firstly, the receptor cylinder 6 is surrounded by a rubber gasket 17 for ensuring a tight connection between the side receptor 1 and the surrounding parts of the surface of the wind turbine blade 2. This tightness is obtained by making the rounded surface of the receptor cylinder 6 as well as the inner surface of the rubber gasket 17 slightly conical, so that the receptor cylinder 6 fits tightly into the rubber gasket 17, when the receptor cylinder 6 is pressed into the rubber gasket 17 during mounting of the side receptor 1 in a wind turbine blade 2.

Secondly, this embodiment of the receptor assembly comprises an electrically insulating shim 23, made for instance from Glass Fibre Reinforced Polymer (GFRP), which is arranged between the head of the mounting bolt 9 and the internal surface of the partly closed end of the receptor cylinder 6. Apart from providing electrical insulation between the head of the mounting bolt 9 and the receptor cylinder 6, this shim 23 also serves the purpose of controlling the position of the mounting bolt 9. The shim 23 ensures that the threaded part of the mounting bolt 9 is centered within the hole in the receptor cylinder 6, so that electric contact between the mounting bolt 9 and the receptor cylinder 6 is avoided, and it adjusts the height of the head of the mounting bolt 9 within the receptor cylinder 6.

Thirdly, the bolt insulator 15 surrounding the head of the mounting bolt 9 as well as the screw cap 14 are physically integrated within the receptor plug 7. In the shown embodiment, this receptor plug 7 is made from an elastic material, such as rubber, and provided with a peripheral tongue fitting into a corresponding groove in the inner surface of the receptor cylinder 6. This means that, if the receptor plug 7 is pounded into the receptor cylinder 6, it is kept in position by the tongue within the groove.

Figure 7:
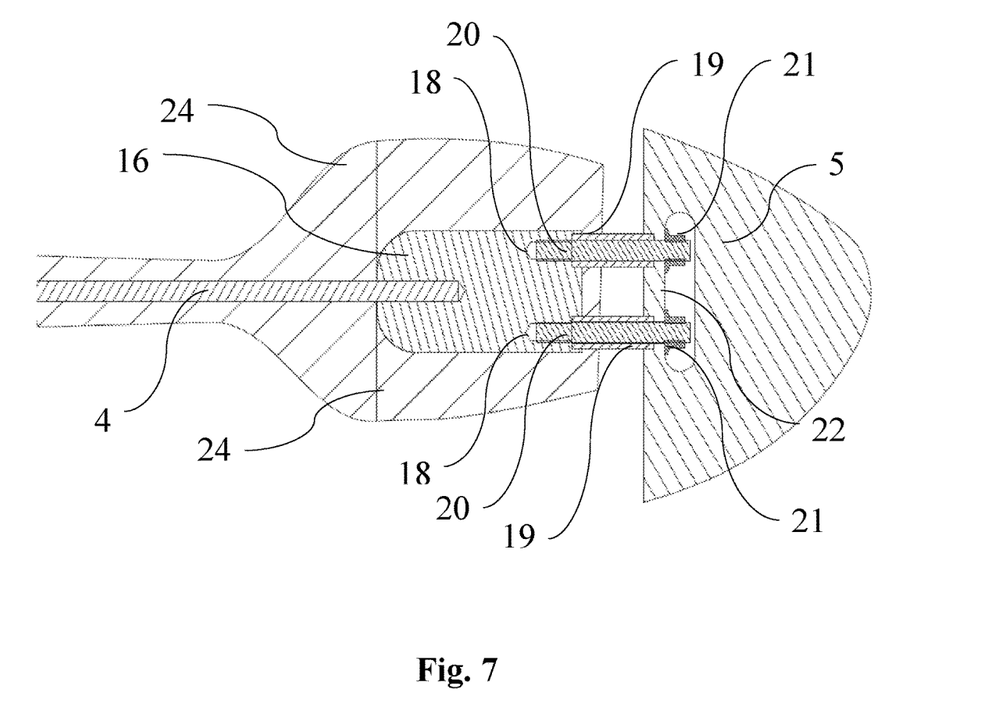
FIG. 7 is a cross-sectional view of a receptor assembly according to an embodiment of the invention.
Figure 8:
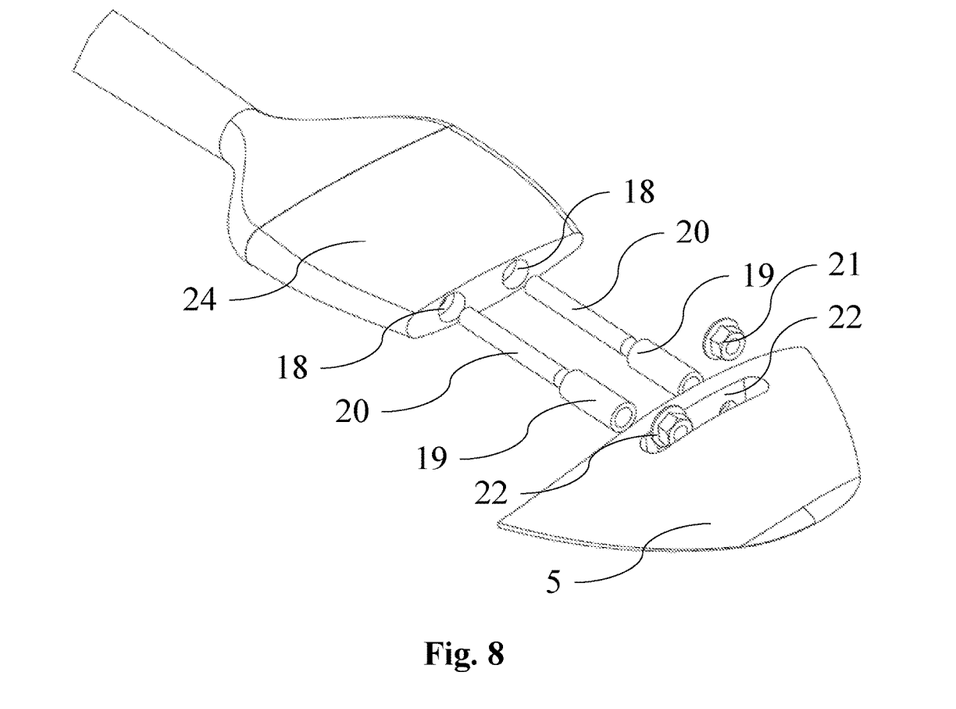
FIG. 8 is an explosive view of the receptor assembly shown in FIG. 7.

FIGS. 7 and 8 are a cross-sectional view and an explosive view, respectively, of a receptor assembly in the form of a tip receptor assembly according to an embodiment of the invention.

In this embodiment of the invention, a tip receptor 5 is mounted to a tip receptor base 16 by means of two threaded rods 20. These threaded rods 20 are screwed into threaded holes 18 within the tip receptor base 16 and an electrically conducting bushing 19 is arranged around each of the threaded rods 20. The free ends of the threaded rods 20 are put into holes in the surface of the tip receptor 5 facing towards the tip receptor base 16, and nuts 21 are mounted and tightened around these ends of the threaded rods 20 within the tip receptor 5 through an opening 22 in the side of the tip receptor 5.

This means that the tip receptor 5 is in mechanical and electrical contact with one end of the conducting bushings 19 and the tip receptor base 16 is in mechanical and electrical contact with the other end of the conducting bushings 19. The figures illustrate, how the tip receptor base 16 is covered by a layer of electrically insulating material 24, through which two openings gives access for the threaded rods 20 and the surrounding bushings 19 to be in electrical and mechanical contact with the tip receptor base 16.

The fact that the lightning current tends to pass along the surfaces of conductors rather than through the more central parts thereof means that the vast majority of the lightning current passes through the conducting bushings 19 and only a negligible part passes through the threaded rods 20, which are therefore not damaged, when the receptor assembly is subject to a lightning impact. Thus, the threaded rods 20 and the nuts 21 are kept intact and can be used normally in case of the need for replacement of the tip receptor assembly or parts thereof.

The opening 22, through which the nuts 21 are mounted, can be closed with a receptor plug (not shown) consisting, for instance, of a heat resistant paste, such as silicone, or made from a solid material, such as a metal, a plastic material, rubber or fibreglass.

LIST OF REFERENCE NUMBERS

1. Side receptor
2. Wind turbine blade
3. Side receptor base
4. Down conductor
5. Tip receptor
6. Receptor cylinder
7. Receptor plug
8. Insulation of side receptor base
9. Mounting bolt
10. Contact surface
11. Receptor ruff
12. Blade surface protection
13. Sealant
14. Screw cap
15. Bolt insulator
16. Tip receptor base
17. Rubber gasket 18. Threaded hole
19. Conducting bushing
20. Threaded rod
21. Nut
22. Opening in tip receptor
23. Insulating shim
24. Insulation of tip receptor base

The invention claimed is:

1. A receptor assembly for a lightning protection system for a wind turbine blade, the receptor assembly comprises one or more electrically conducting current carriers being arranged to carry lightning currents from a surface of the wind turbine blade to an internal part of the lightning protection system arranged within the wind turbine blade and one or more mounting bolts or threaded rods,
   wherein each of the current carriers is a metallic part arranged and dimensioned to surround at least a part of a mounting bolt or a threaded rod,
   at least a part of an external surface at one end of each current carrier is arranged to be a contact surface for mechanical and electrical contact to a receptor base when the receptor assembly is mounted within a wind turbine blade,
   in such a way that, in the case of a lightning impact on the receptor assembly, a vast majority of the lightning current passes through the one or more current carriers rather than through the one or more mounting bolts and/or threaded rods on its way through the receptor.

2. The receptor assembly according to claim 1, comprising a side receptor comprising a current carrier comprising a tubular receptor cylinder with one partly closed end penetrated by a centred hole, at least a part of the external surface of which partly closed end is arranged to be a contact surface for mechanical and electrical contact to a side receptor base when the side receptor is mounted within a wind turbine blade, and a diameter the centred hole is slightly larger than a diameter of a thread part of a mounting bolt,
   wherein an inner diameter of the receptor cylinder is larger than a diameter of a head of the mounting bolt and an internal length of the receptor cylinder is larger than a height of the head of the bolt so that the mounting bolt can be arranged with its head concealed within the receptor cylinder and its thread part protruding through the centred hole in the partly closed end thereof, and
   wherein a receptor plug is dimensioned to fit into an end of the receptor cylinder opposite the partly closed end to cover the head of the mounting bolt concealed therein.

3. The receptor assembly according to claim 2, wherein the receptor plug consists of a heat resistant paste.

4. The receptor assembly according to claim 3, wherein a screw cap, is arranged within a slot of the mounting bolt.

5. The receptor assembly according to claim 2, wherein the receptor plug is made from a solid material.

6. The receptor assembly according to claim 2, further comprising around the head of the mounting bolt a bolt insulator for insulating the mounting bolt electrically from the receptor cylinder.

7. The receptor assembly according to claim 2, wherein a rounded surface of the receptor cylinder is slightly conical and wherein the side receptor further comprises a rubber gasket surrounding the receptor cylinder and having a slightly conical inner surface arranged to receive and fit the receptor cylinder, when the receptor cylinder is pressed into the rubber gasket during mounting of the side receptor in a wind turbine blade.

8. The receptor assembly according to claim 2, wherein the receptor cylinder consists at least partly of copper or a copper alloy.

9. The receptor assembly according to claim 2, wherein the receptor cylinder consists at least partly of aluminium.

10. The receptor assembly according to claim 2 wherein the receptor cylinder at its end opposite the partly closed end is covered with a protective layer of a temperature-resistant material.

11. The receptor assembly according to claim 2, wherein the receptor cylinder consists at least partly of tungsten carbide.

12. The receptor assembly according to claim 1, comprising a tip receptor and one or more current carriers comprising conducting bushings, an inner diameter of the bushings is larger than a diameter of bolts or threaded rods extending through the bushings for mounting the tip receptor to a tip receptor base,
    so that, when the tip receptor is mounted within a wind turbine blade, the tip receptor is in mechanical and electrical contact with one end of the conducting bushings and the tip receptor base is in mechanical and electrical contact with the other end of the conducting bushings.

13. The receptor assembly according to claim 12, wherein the tip receptor comprises, in a surface facing towards the tip receptor base when the tip receptor is mounted within a wind turbine blade, holes for receiving threaded rods and, in one or more other surfaces, one or more openings through which nuts can be mounted and tightened around ends of the threaded rods within the tip receptor.

14. The receptor assembly according to claim 13, further comprising receptor plugs dimensioned to fit into the one or more openings to cover the nuts concealed therein.

15. The receptor assembly according to claim 14, wherein the receptor plug consists of a heat resistant paste.

16. The receptor assembly according to claim 14, wherein the receptor plug is made from a solid material.

17. The receptor assembly according to claim 12, wherein the bushings consist at least partly of aluminium.

18. A lightning protection system for a wind turbine blade comprising one or more receptor assemblies according to claim 1.

19. A wind turbine comprising a lightning protection system according to claim 18.

* * * * *